United States Patent
Yurugi et al.

(10) Patent No.: US 12,467,885 B2
(45) Date of Patent: Nov. 11, 2025

(54) X-RAY INSPECTION DEVICE

(71) Applicant: ISHIDA CO., LTD., Kyoto (JP)

(72) Inventors: Futoshi Yurugi, Ritto (JP); Yoshiaki Sakagami, Ritto (JP); Atsushi Yamakawa, Ritto (JP); Kota Tominaga, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 187 days.

(21) Appl. No.: 18/539,236

(22) Filed: Dec. 13, 2023

(65) Prior Publication Data
US 2024/0219324 A1    Jul. 4, 2024

(30) Foreign Application Priority Data

Dec. 28, 2022 (JP) ................. 2022-212447

(51) Int. Cl.
*G01N 23/083* (2018.01)
*G01N 23/04* (2018.01)

(52) U.S. Cl.
CPC .......... *G01N 23/083* (2013.01); *G01N 23/04* (2013.01); *G01N 2223/3103* (2013.01); *G01N 2223/643* (2013.01)

(58) Field of Classification Search
CPC ................. G01N 23/083; G01N 23/04; G01N 2223/3103; G01N 2223/643; G01N 2223/304; G01V 5/22; G01T 7/00
See application file for complete search history.

(56) References Cited

U.S. PATENT DOCUMENTS

2019/0297717 A1*  9/2019  Kondo .................. G01N 23/04

FOREIGN PATENT DOCUMENTS

JP            5184848 B2    4/2013
JP         2019164088 A    9/2019

OTHER PUBLICATIONS

Extended Search Report in the corresponding European Patent Application No. 23219368.0 dated May 6, 2024.

* cited by examiner

*Primary Examiner* — Courtney D Thomas
(74) *Attorney, Agent, or Firm* — Global IP Counselors, LLP

(57) ABSTRACT

An X-ray inspection device includes a conveyor, an X-ray irradiation unit, an X-ray detection unit, an inspection unit configured to inspect an article on the basis of an X-ray transmission image, a housing accommodating the X-ray irradiation unit and the X-ray detection unit, a cool air blower configured to cool air inside the housing and guide cool air to the X-ray detection unit via a duct, a monitoring unit configured to monitor a state of the cool air blower, and a control unit configured to stop the flow of air to the X-ray detection unit when an anomaly of the cool air blower is detected by the monitoring unit.

5 Claims, 8 Drawing Sheets

X-RAY INSPECTION DEVICE

CROSS REFERENCE TO RELATED APPLICATIONS

This application claims the benefit of priority to Japanese Patent Application Number 2022-212447 filed on Dec. 28, 2022, the entire contents of the above-identified application are hereby incorporated by reference.

TECHNICAL FIELD

The disclosure relates to an X-ray inspection device.

BACKGROUND

An X-ray inspection device includes a conveyor that conveys an article, an X-ray irradiation unit that irradiates the article conveyed by the conveyor with an X-ray, and an X-ray detection unit that detects the X-ray transmitted through the article. The X-ray inspection device described in JP 2019-164088 A includes an air guide unit that guides cool air supplied from a cool air blower to at least a portion of the X-ray detection unit via a duct to cool the X-ray detection unit.

SUMMARY

In a configuration in which the X-ray detection unit is cooled as in the X-ray inspection device described above, cool air supplied from the cool air blower is dehumidified by heat exchange when the air is cooled. Therefore, the environment in which the X-ray detection unit to which the cool air is guided and members surrounding the X-ray detection unit (e.g., a sensor box) are disposed is in a state of low humidity (dry state). In this state, when a malfunction occurs in the cooling function or the like of the cool air blower and insufficiently cooled air (moisture-containing air) is guided to the X-ray detection unit which has a lowered temperature, condensation may occur on the X-ray detection unit or the members surrounding the X-ray detection unit. When water generated by the condensation enters the X-ray detection unit, a malfunction may occur in the X-ray detection unit.

An aspect of the disclosure is to provide an X-ray inspection device that can suppress the occurrence of malfunction in an X-ray detection unit in a configuration in which the X-ray detection unit is cooled.

(1) An X-ray inspection device according to one aspect of the disclosure includes a conveyor configured to convey an article, an X-ray irradiation unit configured to irradiate the article conveyed by the conveyor with an X-ray, an X-ray detection unit configured to detect the X-ray transmitted through the article, an inspection unit configured to generate an X-ray transmission image from the X-ray detected by the X-ray detection unit and inspect the article on the basis of the X-ray transmission image, a housing accommodating the X-ray irradiation unit and the X-ray detection unit, a cool air blower configured to cool air inside the housing and guide cool air to the X-ray detection unit via a duct, a monitoring unit configured to monitor a state of the cool air blower, and a control unit configured to stop the flow of air to the X-ray detection unit w % ben an anomaly of the cool air blower is detected by the monitoring unit.

In the X-ray inspection device according to one aspect of the disclosure, the flow of air to the X-ray detection unit is stopped when an anomaly of the cool air blower is detected by the monitoring unit. As a result, in the X-ray inspection device, when some kind of anomaly (malfunction) occurs in a cool air blower and cool air cannot be supplied from the cool air blower, insufficiently cooled air (moisture-containing air) is not guided to the X-ray detection unit. Thus, in the X-ray inspection device, it is possible to suppress the occurrence of condensation on the X-ray detection unit and other components. Accordingly, in the X-ray inspection device, it is possible to help prevent water formed by the condensation from entering the X-ray detection unit. As a result, in the X-ray inspection device, it is possible to suppress the occurrence of malfunction in the X-ray detection unit in a configuration in which the X-ray detection unit is cooled.

(2) In the X-ray inspection device according to (1) described above, the control unit may stop the irradiation of the X-ray by the X-ray irradiation unit and the detection of the X-ray by the X-ray detection unit when an anomaly of the cool air blower is detected by the monitoring unit. With this configuration, when an anomaly occurs in the cool air blower, the irradiation of the X-ray by the X-ray irradiation unit and the detection of the X-ray by the X-ray detection unit are stopped. Thus, it is possible to suppress a temperature rise inside the housing, and thus suppress overheating of the X-ray detection unit.

(3) In the X-ray inspection device according to (1) or (2) described above, the control unit may continue the conveyance of the article by the conveyor when an anomaly of the cool air blower is detected by the monitoring unit. When operation of the conveyor is stopped due to the occurrence of an anomaly in the cool air blower, the article may be left behind in the X-ray inspection device and it may no longer be possible to determine whether the article was inspected. In this case, the article may need to be disposed of, resulting in waste. In the X-ray inspection device, when an anomaly of the cool air blower is detected by the monitoring unit, the conveyance of the article by the conveyor is continued. Accordingly, in the X-ray inspection device, it is possible to keep the article from being left behind in the X-ray inspection device, and thus avoid the generation of waste. Further, in the X-ray inspection device, by continuing the conveyance by the conveyor, it is possible to continue inspection until the X-ray detection unit reaches a predetermined temperature, for example, and troubleshoot the anomaly of the cool air blower during that time. Accordingly, the operation of a line in which the article is processed can continue.

(4) The X-ray inspection device according to any one of (1) to (3) described above may further include a discharge unit configured to discharge water generated inside the housing to outside of the housing, the cool air blower may cool the air inside the housing by internal air circulation to generate the cool air, and the discharge unit may include a sealing portion and/or a check valve, the sealing portion and the check valve being configured to prevent external air from flowing into the housing. With this configuration, it is possible to help prevent high-temperature and humid air from flowing into the housing via the discharge unit. Accordingly, in the X-ray inspection device, it is possible to suppress the occurrence of condensation on the X-ray detection unit and other components caused by the air.

(5) The X-ray inspection device according to any one of (1) to (4) described above may include a blower configured to blow the cool air supplied from the cool air blower to the duct, and the control unit may stop operation of the blower when an anomaly of the cool air blower is detected by the monitoring unit. With this configuration, it is possible to more reliably suppress the guidance of insufficiently cooled air to the X-ray detection unit.

According to one aspect of the disclosure, it is possible to suppress the occurrence of malfunction in an X-ray detection unit in a configuration in which the X-ray detection unit is cooled.

DESCRIPTION OF EMBODIMENTS

Figure 1:
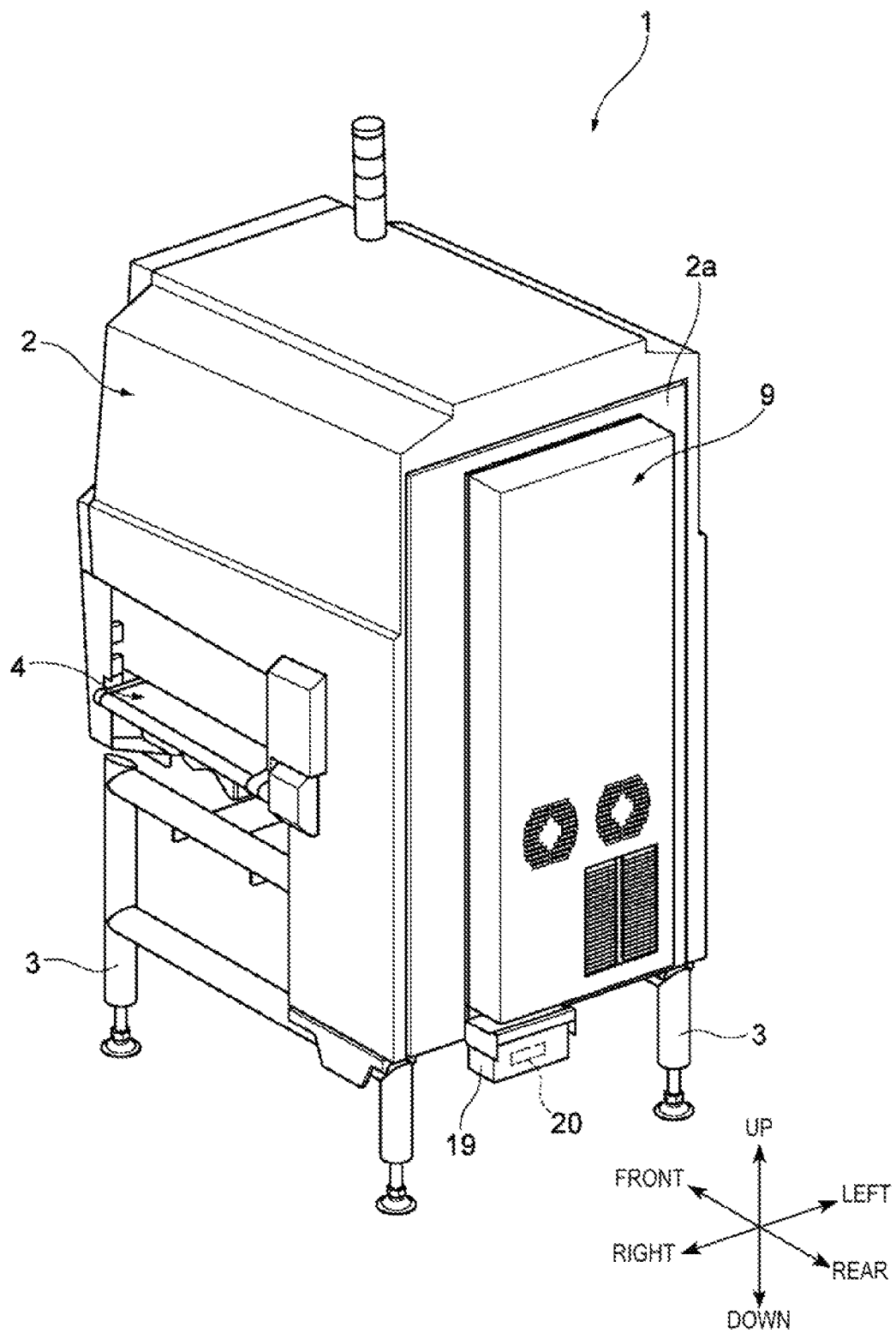
FIG. 1 is a perspective view illustrating an appearance of an X-ray inspection device according to an embodiment.

Preferred embodiments of the disclosure will be described below in detail with reference to the attached drawings. Note that, in the description of the drawings, like or equivalent elements are denoted by the same reference signs and redundant descriptions thereof will be omitted. In FIG. 1, FIG. 3, FIG. 5, and FIG. 6, "up", "down", "left", "right", "front", and "rear" are defined for convenience of description. However, the embodiments are not limited to these directions.

As illustrated in FIG. 1 to FIG. 4, an X-ray inspection device 1 includes a housing 2, support legs 3, a conveyor 4, an X-ray irradiation unit 5, an X-ray detection unit 6, a display operation unit 7, a control unit (inspection unit) 8, and a cool air blower 9. The X-ray inspection device 1 generates an X-ray transmission image of an article G while conveying the article G, and conducts an inspection (e.g., an accommodated quantity inspection, a foreign matter contamination inspection, a missing part inspection, or a chip/crack inspection) of the article G on the basis of the X-ray transmission image.

The housing 2 accommodates the conveyor 4, the X-ray irradiation unit 5, the X-ray detection unit 6, and the control unit 8. In an interior of the housing 2, an inspection region R is set where the article G is inspected with X-rays. The support legs 3 support the housing 2. The conveyor 4 conveys the article G in a conveyance direction A. The conveyor 4 is, for example, a belt conveyor.

The X-ray irradiation unit 5 irradiates the article G conveyed by the conveyor 4 with X-rays. The X-ray irradiation unit 5 is provided with a fan 10 rearward of the X-ray irradiation unit 5.

The X-ray detection unit 6 is a sensor 11 that detects electromagnetic waves. The X-ray detection unit 6 may be configured to detect an X-ray in a specific energy band or may be configured to detect an X-ray by a photon counting method. The X-ray detection unit 6 may be a direct conversion type detection unit or an indirect conversion type detection unit. In the present embodiment, the X-ray detection unit 6 is a direct conversion type detection unit that can detect an X-ray by a photon counting method, and includes sensors (multi-energy sensors) that detect X-rays in each of a plurality of energy bands transmitted through the article G. The sensors are arranged linearly at least in a direction (width direction) orthogonal to the conveyance direction of the conveyor 4 and the up-down direction, for example. These elements may be arranged linearly not only in the width direction described above but also in the conveyance direction described above. That is, the X-ray detection unit 6 may include a line sensor or may include a sensor group disposed two dimensionally. The sensor 11 is, for example, a photon detection type sensor such as a CdTe semiconductor detector.

Figure 5:
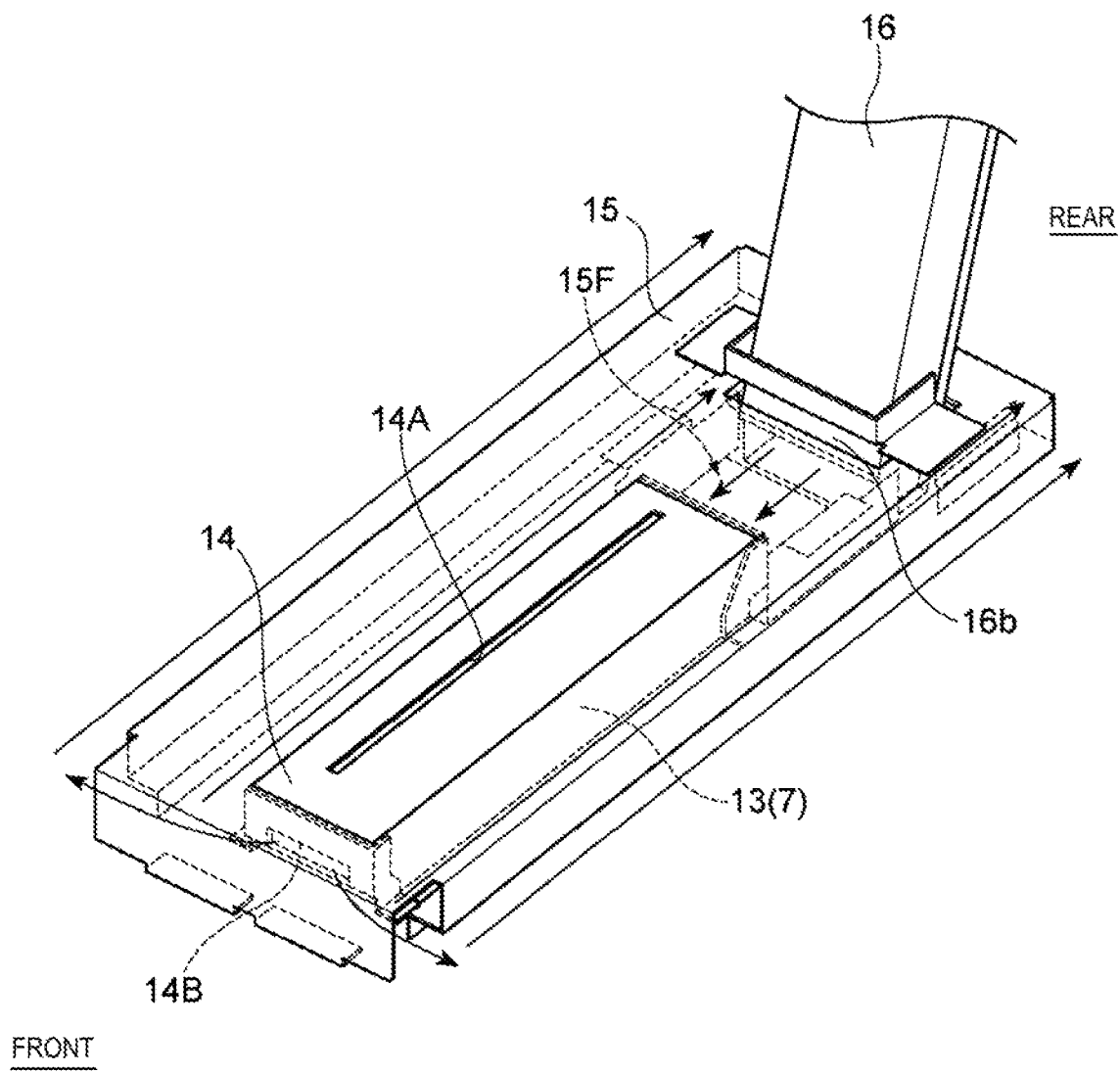
FIG. 5 is a perspective view illustrating an accommodating portion and a duct.
Figure 6:
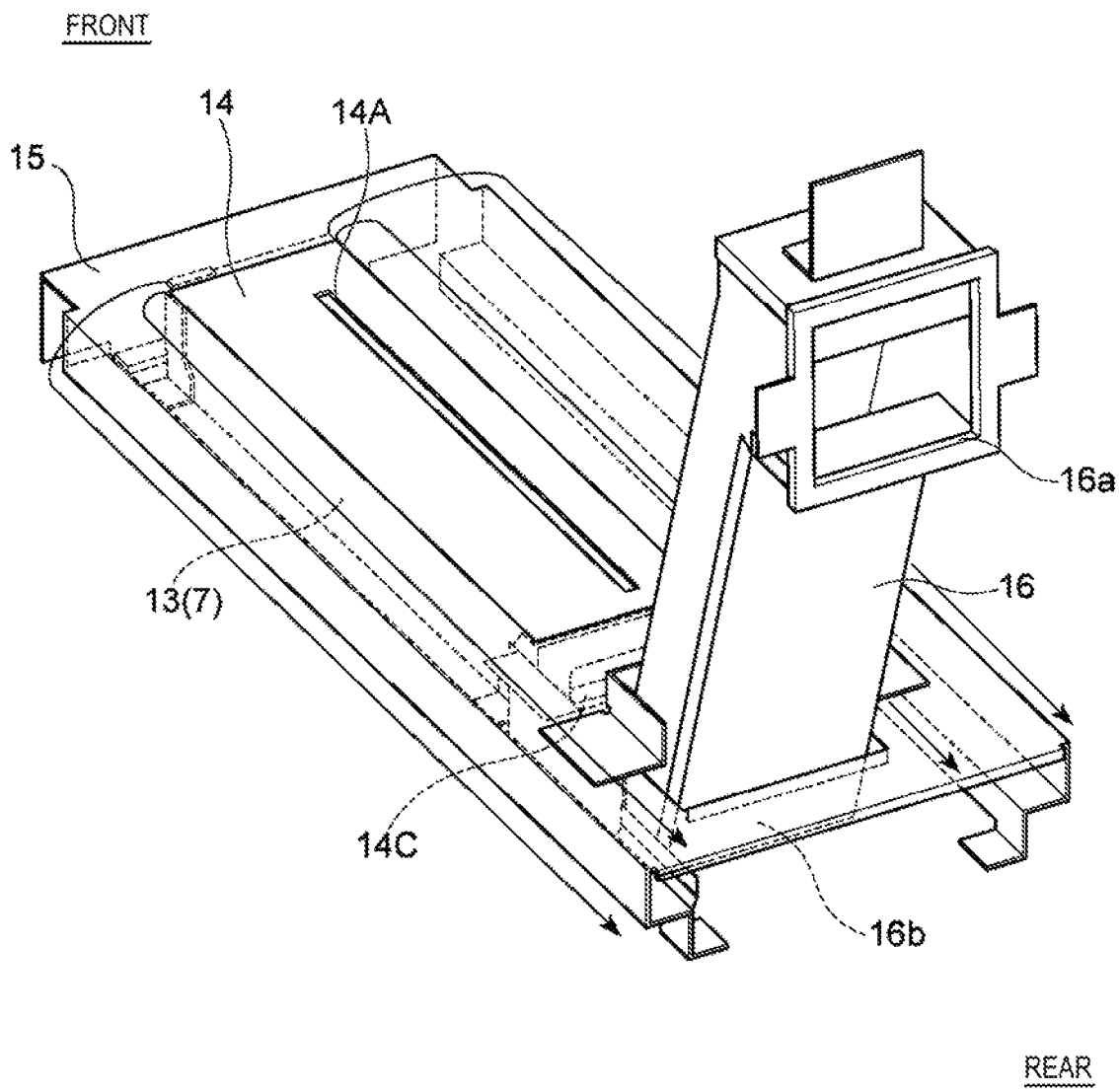
FIG. 6 is a perspective view illustrating the accommodating portion and the duct.
Figure 7:
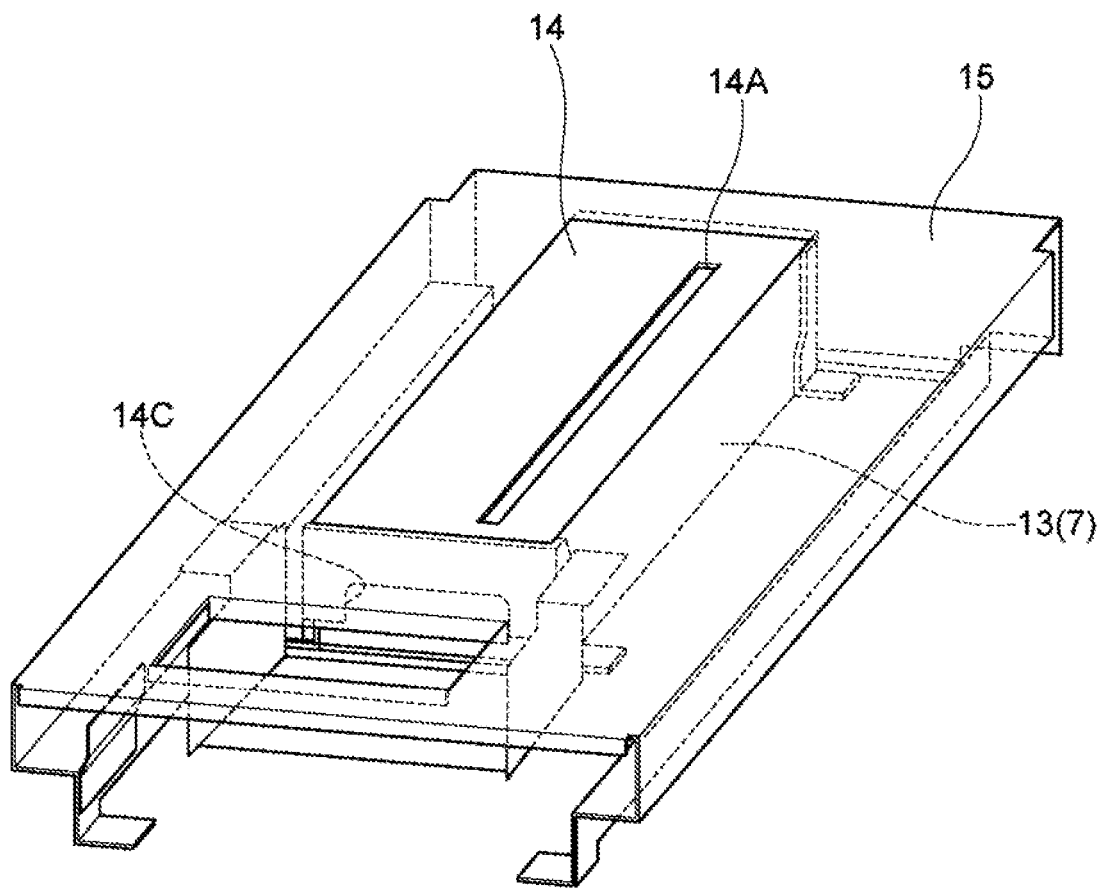
FIG. 7 is a perspective view illustrating the accommodating portion.

In the present embodiment, the X-ray detection unit 6 is configured as an X-ray detection module 13 in which a control board (not illustrated) is added to the sensor 11. The X-ray detection module 13 is accommodated in a sensor box 14. The sensor box 14 is a rectangular parallelepiped-shaped housing that accommodates the X-ray detection unit 6. A slit 14A is formed in an upper face of the sensor box 14. X-rays emitted from the X-ray irradiation unit 5 pass through the slit 14A. As illustrated in FIG. 5, an opening 14B is provided on a front face of the sensor box 14. As illustrated in FIG. 6 and FIG. 7, an opening 14C is provided on a rear face of the sensor box 14.

As illustrated in FIG. 5 to FIG. 7, the sensor box 14 is accommodated in an accommodating portion 15. The accommodating portion 15 is disposed below the conveyor 4. A flow path 15F for cool air supplied from the cool air blower 9 is formed in the accommodating portion 15. The cool air is guided into the accommodating portion 15 through a duct 16. The duct 16 is connected to a rear portion of the accommodating portion 15.

Figure 3:
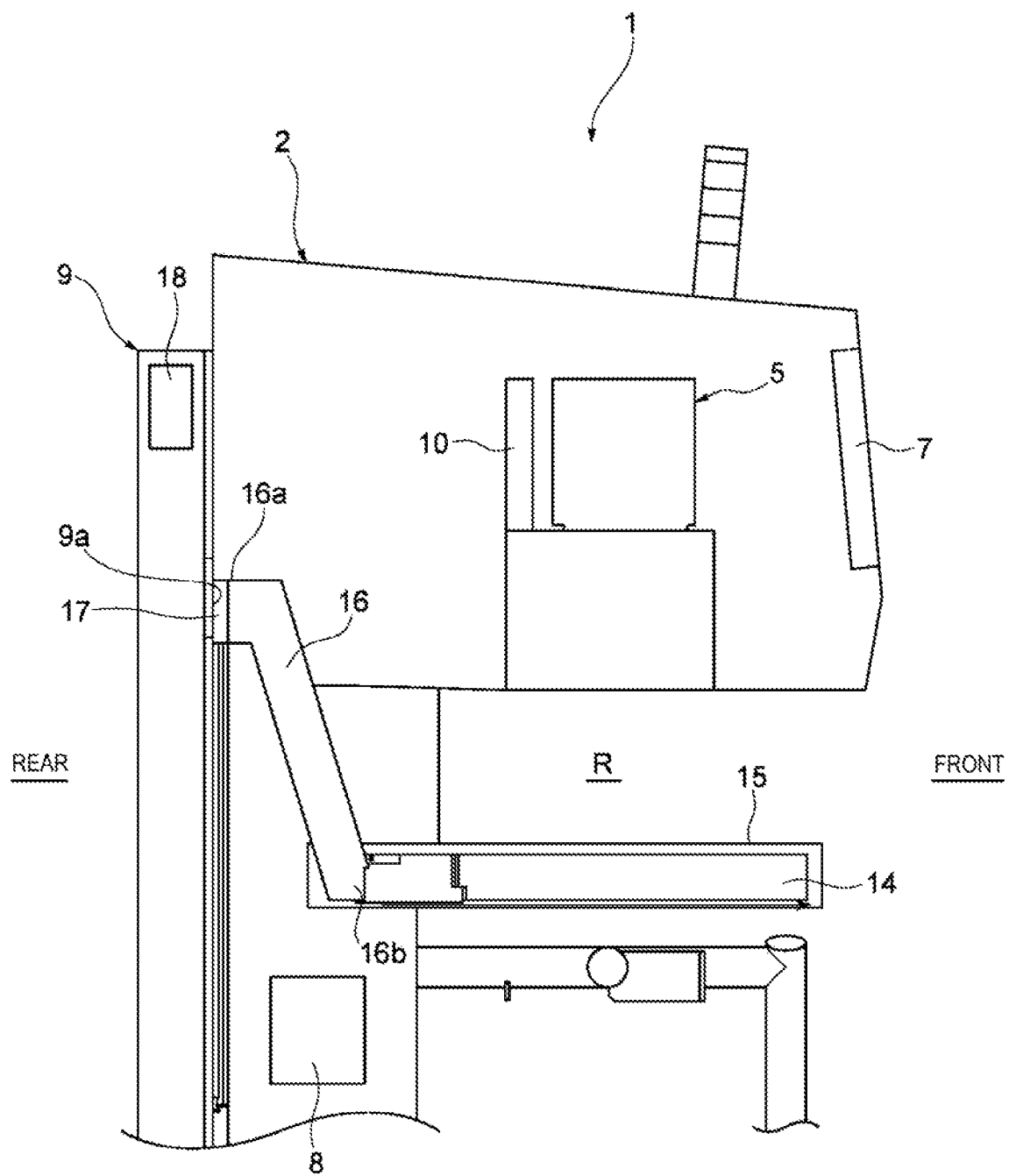
FIG. 3 is a diagram illustrating the configuration of the X-ray inspection device in FIG. 1 from a side face side.
Figure 4:
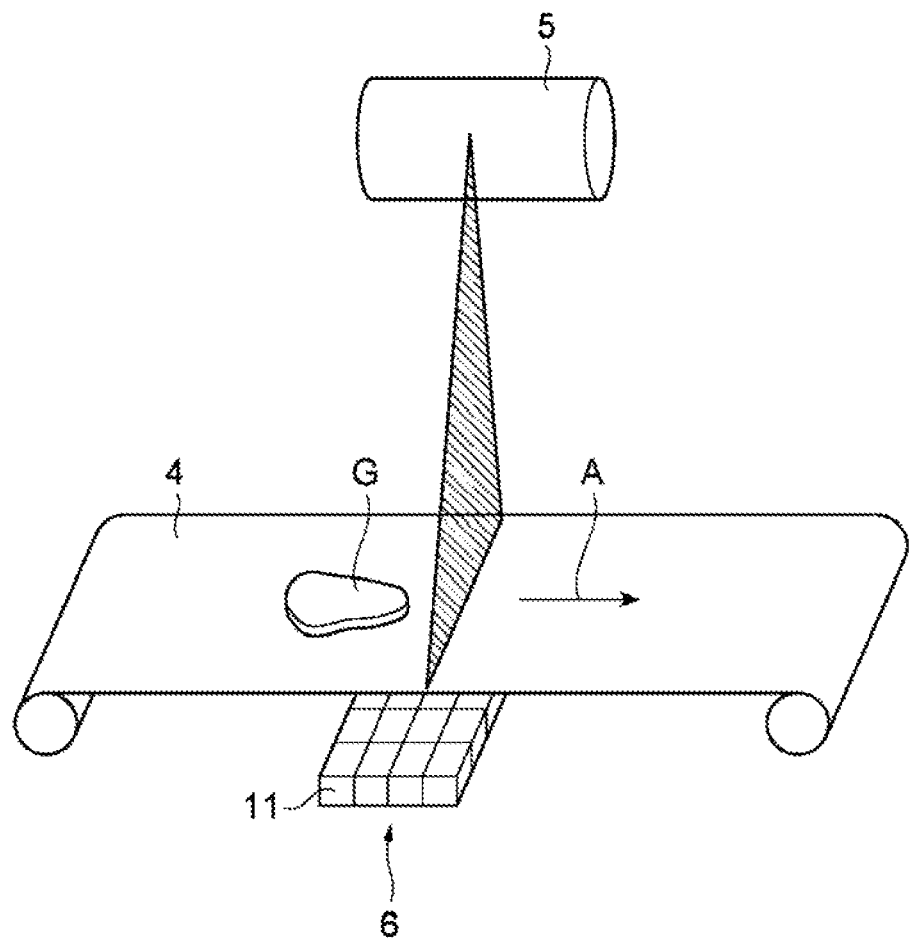
FIG. 4 is a perspective view illustrating a housing interior of the X-ray inspection device of FIG. 1.

As illustrated in FIG. 3, the display operation unit 7 is provided in the housing 2. The display operation unit 7 displays various types of information and receives inputs for various conditions. The display operation unit 7 is, for example, a liquid crystal display and displays an operation screen as a touch panel.

As illustrated in FIG. 3, the control unit 8 is disposed in the interior of the housing 2. The control unit 8 controls the operation of each component of the X-ray inspection device 1. The control unit 8 includes a central processing unit (CPU), a read only memory (ROM), and a random access memory (RAM). Detection results of X-rays in the low energy band and the high energy band are input to the control unit 8 from the sensors 11 (refer to FIG. 4) of the X-ray detection unit 6. The control unit 8 functions as an inspection unit that generates X-ray transmission images on the basis of the detection result of the X-ray in the low energy band and the detection result of the X-ray in the high energy band and inspects the article G on the basis of the X-ray transmission images.

Figure 2:
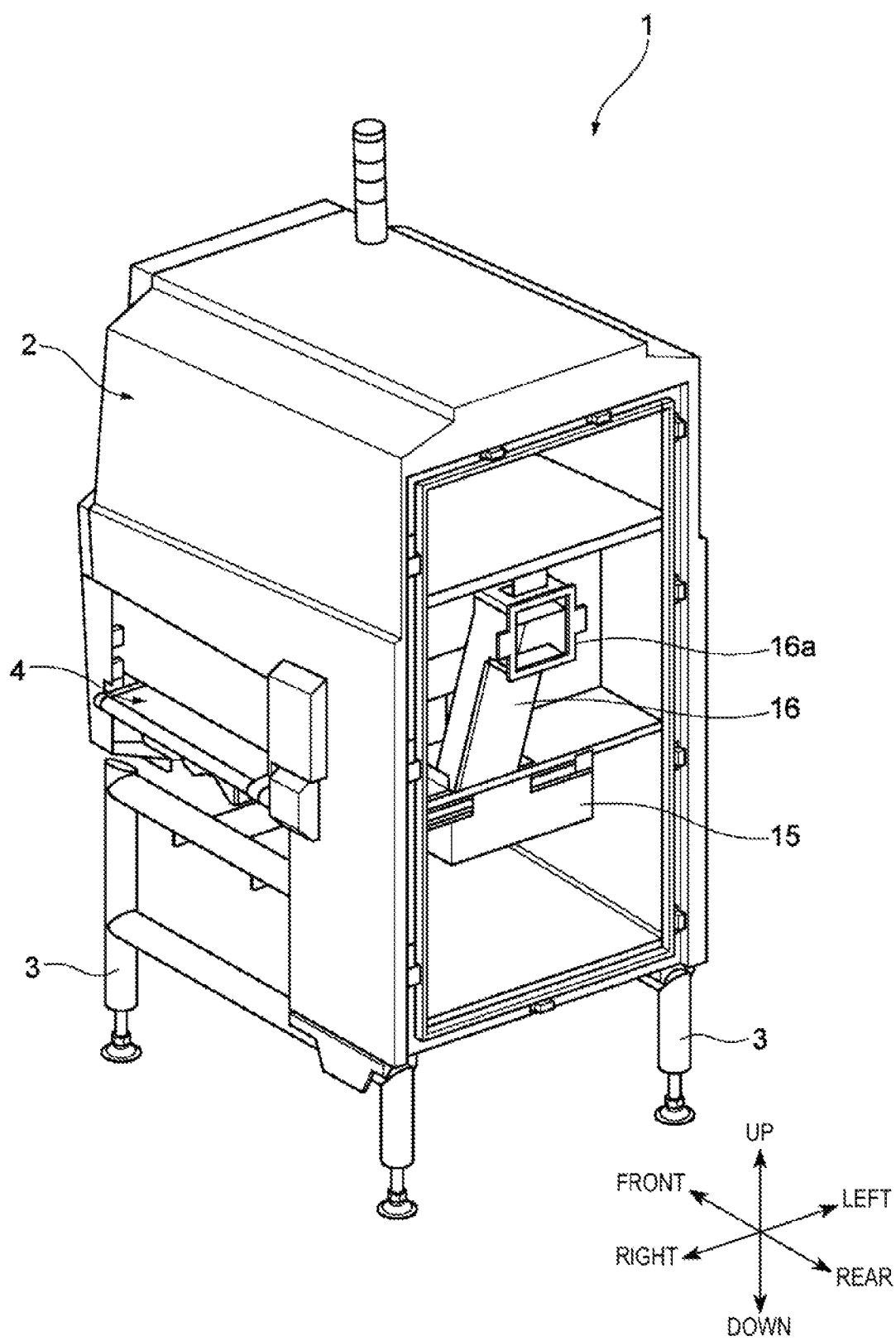
FIG. 2 is a perspective view of the X-ray inspection device illustrated in FIG. 1 with a rear door open.

As illustrated in FIG. 1 and FIG. 2, the cool air blower 9 is disposed on a rear face of the X-ray inspection device 1. In the present embodiment, the cool air blower 9 is attached to a door 2a, with which the housing 2 can be opened and closed. The cool air blower 9 is, for example, a cooler. The cool air blower 9 draws air into the interior of the housing 2, and causes the drawn air to undergo heat exchange in a heat exchanger (not illustrated) to generate air cooled by the heat exchange (cool air). The cool air blower 9 generates the cool air by internal air circulation. The cool air blower 9 supplies the cool air to the accommodating portion 15 via the duct 16.

The duct 16 is attached inside the housing 2. One end 16a of the duct 16 is connected to a supply port 9a of the cool air blower 9. The one end 16a of the duct 16 is open rearward. The one end 16a of the duct 16 is connected to the supply port 9a of the cool air blower 9 in a state in which the door 2a is closed. A fan (blower) 17 is provided between the supply port 9a of the cool air blower 9 and the one end 16a of the duct 16. The fan 17 delivers cool air supplied from the cool air blower 9 to the duct 16. The other end 16b of the duct 16 is connected to the accommodating portion 15.

As illustrated in FIG. 3, the cool air blower 9 includes a monitoring unit 18. The monitoring unit 18 monitors the state of the cool air blower 9. The monitoring unit 18 includes a CPU, a ROM, and a RAM. The monitoring unit 18 is communicably connected to the control unit 8. The monitoring unit 18 accepts input of various types of information related to the operation of the cool air blower 9, monitors the state of the cool air blower 9, and detects an anomaly of the cool air blower 9. The monitoring unit 18 detects, for example, a temperature anomaly of a temperature sensor (not illustrated) of the cool air blower 9 or a current anomaly of a compressor of the cool air blower 9. In a case where an anomaly is detected, the monitoring unit 18 outputs an error signal to the control unit 8.

As illustrated in FIG. 1, the X-ray inspection device 1 includes a discharge unit 19. The discharge unit 19 discharges water generated inside the housing 2 to outside of the housing 2. The discharge unit 19 is provided in the housing 2. The discharge unit 19 is disposed, for example, below the cool air blower 9. The discharge unit 19 is provided with a check valve 20. The check valve 20 prevents air outside the housing 2 from entering the housing 2 via the discharge unit 19. In the discharge unit 19, a sealing portion (not illustrated) is provided at a connection portion with the housing 2. The sealing portion is formed of a material such as rubber. The sealing portion can help prevent external air from flowing into the housing 2 from between the housing 2 and the discharge unit 19.

Next, the flow of the cool air supplied from the cool air blower 9 will be described. The cool air supplied from the cool air blower 9 is supplied to the duct 16 from the supply port 9a of the cool air blower 9. The cool air supplied to the duct 16 flows into the accommodating portion 15. As illustrated in FIG. 3, FIG. 5, and FIG. 6, the cool air flowing into the accommodating portion 15 flows from the opening 14C at the rear of the sensor box 14 to below the sensor box 14, flows frontward in the accommodating portion 15, is partially discharged from the opening 14B, and partially flows rearward through a ventilation path at a lateral inner side defined by the accommodating portion 15. The cool air flowing through the accommodating portion 15 removes heat from the X-ray detection module 13 accommodated in the sensor box 14. Air that has risen in temperature (warm air) is discharged into the housing 2 from the front left and right of the accommodating portion 15 and from the rear of the accommodating portion 15 through the ventilation path.

Next, the operation of the X-ray inspection device 1 will be described. In the X-ray inspection device 1, when an error signal is output from the monitoring unit 18, that is, when an anomaly of the cool air blower 9 is detected, the control unit 8 stops the operation of the fan 17. In other words, when an anomaly of the cool air blower 9 is detected, the control unit 8 stops flow of air to the X-ray detection unit 6. When an error signal is output from the monitoring unit 18, the control unit 8 stops the irradiation of X-rays by the X-ray irradiation unit 5 and the detection of X-rays by the X-ray detection unit 6. In the present embodiment, when an error signal is output from the monitoring unit 18, the control unit 8 turns off the power source of the X-ray irradiation unit 5 and the X-ray detection unit 6. When an error signal is output from the monitoring unit 18, the control unit 8 stops conveyance of the article G by the conveyor 4. In the present embodiment, when an error signal is output from the monitoring unit 18, the control unit 8 turns off the power source of the conveyor 4.

In the X-ray inspection device 1, for example, when the error of the cool air blower 9 is resolved, the control unit 8 resumes operation of each component (the conveyor 4, the X-ray irradiation unit 5, and the X-ray detection unit 6) in response to an operation by an operator on the display operation unit 7.

As described above, in the X-ray inspection device 1 according to the present embodiment, when an anomaly of the cool air blower 9 is detected by the monitoring unit 18, the flow of air to the X-ray detection unit 6 is stopped. As a result, in the X-ray inspection device 1, when some kind of anomaly (malfunction) occurs in the cool air blower 9 and cool air cannot be supplied from the cool air blower 9, insufficiently cooled air (moisture-containing air) is not guided to the X-ray detection unit 6. Thus, in the X-ray inspection device 1, it is possible to suppress the occurrence of condensation on the X-ray detection unit 6 and other components. Accordingly, in the X-ray inspection device 1, it is possible to help prevent moisture generated from the condensation from entering the X-ray detection unit 6. As a result, in the X-ray inspection device 1, it is possible to suppress the occurrence of malfunction in the X-ray detection unit 6 in a configuration in which the X-ray detection unit 6 is cooled.

In the X-ray inspection device 1, when the cool air blower 9 and the fan 17 are made to operate in conjunction with each other and the ambient temperature of the X-ray inspection device 1 is low, the operation of the fan 17 is stopped in conjunction with stopping the operation of the cool air blower 9. In this case, because the flow of air to the X-ray detection unit 6 (X-ray detection module 13) is stopped, the X-ray detection unit 6 may overheat. In the X-ray inspection device 1 according to the present embodiment, the cool air blower 9 and the fan 17 are operated independently. Thus, even if the operation of the cool air blower 9 is stopped, low-temperature air inside the housing 2 can be sent to the X-ray detection unit 6. This makes it possible to avoid the X-ray detection unit 6 overheating.

In the X-ray inspection device 1 according to the present embodiment, when an anomaly of the cool air blower 9 is detected by the monitoring unit 18, the control unit 8 stops the irradiation of the X-rays by the X-ray irradiation unit 5 and the detection of the X-rays by the X-ray detection unit 6. With this configuration, when an anomaly occurs in the cool air blower 9, the irradiation of X-rays by the X-ray irradiation unit 5 and the detection of X-rays by the X-ray detection unit 6 are stopped. Thus, it is possible to suppress a temperature rise inside the housing 2, and thus suppress overheating of the X-ray detection unit 6.

The X-ray inspection device 1 according to the present embodiment includes the discharge unit 19 that discharges water generated inside the housing 2 to outside the housing 2. The discharge unit 19 includes the sealing portion and the check valve 20 that suppress the inflow of external air into the housing 2. With this configuration, it is possible to help prevent high temperature and humid air from flowing into the housing 2 via the discharge unit 19. Accordingly, in the X-ray inspection device 1, it is possible to suppress the occurrence of condensation on the X-ray detection unit 6 and other components caused by the air.

Although embodiments of the disclosure have been described above, the disclosure is not necessarily limited to the above-described embodiments, and various modifications can be made without departing from the gist of the disclosure.

Figure 8:
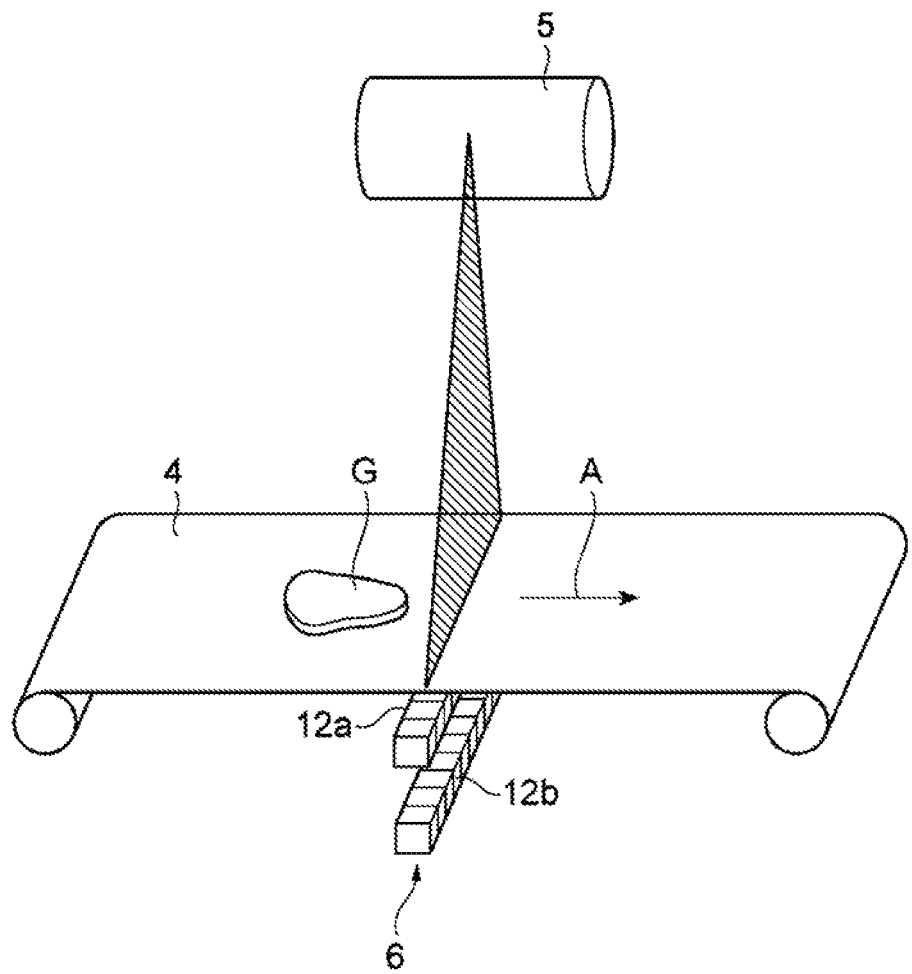
FIG. 8 is a perspective view of the housing interior of an X-ray inspection device according to another embodiment.

In the embodiments described above, a mode in which the X-ray detection unit 6 is a so-called photon-counting sensor is described as an example. However, as illustrated in FIG. 8, the X-ray detection unit 6 may include a first line sensor 12*a* and a second line sensor 12*b*. Each of the first line sensor 12*a* and the second line sensor 12*b* is constituted by X-ray detection elements (not illustrated) arrayed one dimensionally in a horizontal direction perpendicular to the conveyance direction A. The first line sensor 12*a* detects X-rays in a low-energy band transmitted through the article G and the conveyor belt of the conveyor 4. The second line sensor 12*b* detects X-rays in a high-energy band transmitted through the article G, the conveyor belt of the conveyor 4, and the first line sensor 12*a*.

In the embodiments and modified examples described above, a mode in which the X-ray detection unit 6 is configured as the X-ray detection module 13 is described as an example. However, the sensor 11 and the control board may be disposed at different positions.

In the embodiments and modified examples described above, a mode in which the power source of the X-ray irradiation unit 5 is turned off to stop the irradiation of the X-rays by the X-ray irradiation unit 5 and the power source of the X-ray detection unit 6 is turned off to stop the detection of the X-rays by the X-ray detection unit 6 when an anomaly of the cool air blower 9 is detected by the monitoring unit 18 is described as an example. However, in the X-ray inspection device 1, when an anomaly of the cool air blower 9 is detected by the monitoring unit 18, the irradiation of the X-rays by the X-ray irradiation unit 5 and the detection of the X-rays by the X-ray detection unit 6 need only be stopped.

In the embodiments and modified examples described above, a mode in which conveyance of the article G by the conveyor 4 is stopped when an anomaly of the cool air blower 9 is detected by the monitoring unit 18 is described as an example. However, when an anomaly of the cool air blower 9 is detected by the monitoring unit 18, conveyance of the article G by the conveyor 4 may be continued. When operation of the conveyor 4 is stopped due to the occurrence of an anomaly in the cool air blower 9, the article G may be left behind in the X-ray inspection device 1 and it may no longer be possible to determine whether the article G was inspected. Therefore, the article G may need to be disposed of, resulting in waste. In a configuration in which conveyance of the article G by the conveyor 4 is continued when an anomaly of the cool air blower 9 is detected by the monitoring unit 18, it is possible to keep the article G from being left behind in the X-ray inspection device 1, and thus avoid the occurrence of waste. Further, in the X-ray inspection device 1, by continuing conveyance by the conveyor 4, it is possible to continue inspection until the X-ray detection unit 6 reaches a predetermined temperature, for example, and troubleshoot the anomaly of the cool air blower 9 during that time. Accordingly, in the X-ray inspection device 1, operation of a line in which the article G is processed can continue.

In the embodiments and modified examples described above, a mode in which the cool air blower 9 is provided on the door 2*a* with which the housing 2 can be opened and closed is described as an example. However, the cool air blower 9 may be disposed in the interior of the housing 2. Further, the cool air may be supplied to the duct 16 from the cool air blower 9 disposed outside the housing 2 via a duct or the like.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. An X-ray inspection device comprising:
   a conveyor configured to convey an article;
   an X-ray irradiation unit configured to irradiate the article conveyed by the conveyor with an X-ray;
   an X-ray detection unit configured to detect the X-ray transmitted through the article;
   an inspection unit configured to generate an X-ray transmission image from the X-ray detected by the X-ray detection unit and inspect the article on the basis of the X-ray transmission image;
   a housing accommodating the X-ray irradiation unit and the X-ray detection unit;
   a cool air blower configured to cool air inside the housing and guide cool air to the X-ray detection unit via a duct;
   a monitoring unit configured to monitor a state of the cool air blower; and
   a control unit configured to stop the flow of air to the X-ray detection unit when an anomaly of the cool air blower is detected by the monitoring unit.

2. The X-ray inspection device according to claim 1, wherein the control unit stops the irradiation of the X-ray by the X-ray irradiation unit and the detection of the X-ray by the X-ray detection unit when an anomaly of the cool air blower is detected by the monitoring unit.

3. The X-ray inspection device according to claim 1, wherein the control unit continues the conveyance of the article by the conveyor when an anomaly of the cool air blower is detected by the monitoring unit.

4. The X-ray inspection device according to claim 1, further comprising
   a discharge unit configured to discharge water generated inside the housing to outside of the housing,
   wherein the cool air blower cools the air inside the housing by internal air circulation to generate the cool air, and
   the discharge unit includes a sealing portion and/or a check valve, the sealing portion and the check valve being configured to prevent external air from flowing into the housing.

5. The X-ray inspection device according to claim 1, further comprising
   a blower configured to blow the cool air supplied from the cool air blower to the duct,
   wherein the control unit stops operation of the blower when an anomaly of the cool air blower is detected by the monitoring unit.

* * * * *